April 5, 1960   W. E. HORROCKS   2,931,257
NUT POSITIONING DEVICES FOR ALIGNING NUTS IN CRAMPED SPACES
Filed June 11, 1959
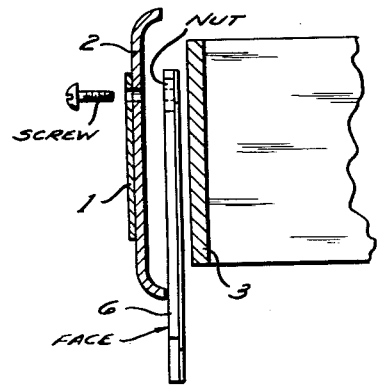
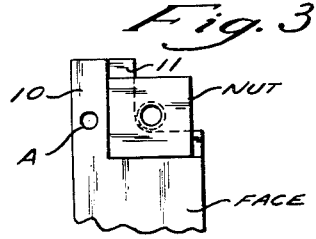
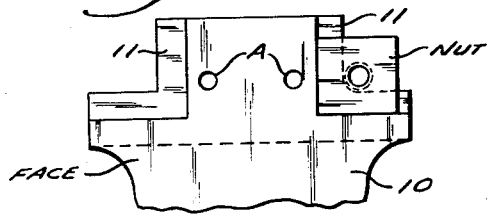
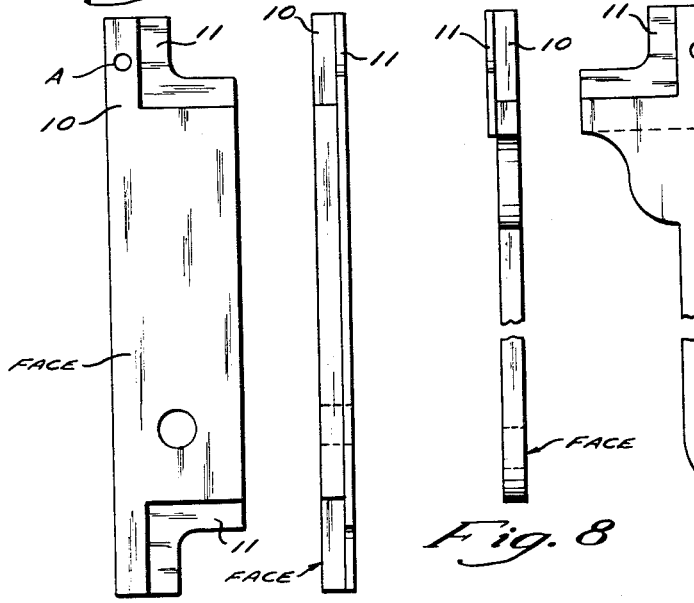
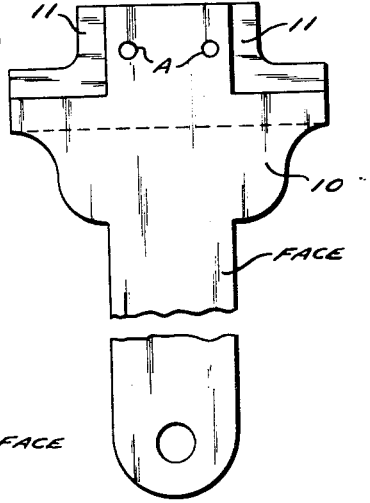
INVENTOR.
Walter E. Horrocks

United States Patent Office 2,931,257
Patented Apr. 5, 1960

2,931,257

NUT POSITIONING DEVICES FOR ALIGNING NUTS IN CRAMPED SPACES

Walter E. Horrocks, Lakewood, Ohio

Application June 11, 1959, Serial No. 819,679

1 Claim. (Cl. 81—3)

My present invention relates to nut positioning devices.

The important object of my invention is to provide a nut holding tool in which a threaded nut can be positioned over an aperture in an element which is placed in such close proximity to an oppositely disposed element that the open space between the two elements is too small or cramped to allow for manually holding and maneuvering a threaded nut in a proper alignment so that a threaded screw or bolt can be screwed into the threaded nut. Another object is to provide a tool that will prevent the nut from turning during the screwing of the bolt or screw into the nut. Another object is to provide a tool designed to hold and position a nut in manually inaccessible spaces in either a left hand or right hand arrangement, such as when obstructing objects are in such close proximity to the apertures which are provided for inserting the anchoring bolts or screws therethrough, that the tool will have to be slid off the nut in either a left hand, or a right hand, or a vertical line of motion.

In securing bumpers such as shown in the Fig. 2, to an automobile frame 4, it is the standard practice to provide Y-shaped brackets in which the prongs of the Y-shapes are utilized to provide apertures for rivets for attaching the bumpers to the frame assembly. The ends of the prongs of the Y-shaped brackets come in such close proximity to the apertures provided for inserting threaded screws or bolts through the bumper for securing the license plate, that it is manually impossible to easily position a nut in a proper alinement so as to easily screw a threaded screw or bolt into a threaded nut, which due to being wiggled along the back side of the bumper results in the nut being slid off the fingers of a person when endeavoring to line up the nut over the apertures in a proper alinement to receive the threaded anchoring screws or bolts to secure the license plate to the bumper element, and an object of the invention is to provide a device for efficiently lining up a nut in back of a bumper without resorting to manually manipulating a nut in cramped spaces as shown and described herewith.

With the above and other objects in view in the accompanying drawings forming a part of this application and in which like numerals indicate like parts throughout the same, preferred examples of the invention are illustrated in which, Fig. 1 shows a partial face side of a rear automobile bumper 2 with a license plate 1 in a position to be attached thereto, Fig. 2 is a sectional view showing a positioning tool 6 inserted between the back side of the rear bumper 2 and the rear end of an automobile frame 3 which forms a part of an automobile chassis 4, Fig. 3 shows one end of the tool that is shown in the Fig. 5, having a nut supported in the notched portion of the body 10 of the tool and in which the notched portion in the backing plate 11 is arranged to allow the screw or bolt to be threaded through the nut, the letter A indicates an aperture in which a stud feeling element (not shown) can be inserted if so desired, so as to project slightly past the face of the tool so as to quickly locate the position of the nut when the tool is shifted sideways along the back side of the bumper 2 in which the projecting end of the stud feeling means will initially drop into the aperture in the bumper 2 indicating the near position of the nut, and then the tool can be shifted slightly so as to line up the nut to receive the screw or bolt, after which the tool can be slide sideways off the nut in cramped spaces.

Fig. 4 shows the nut positioning end of the tool shown in the Fig. 7, having a nut positioned on one notched portion of the body 10 of the tool and in which the notched portion in the backing plate 11 is arranged to allow of a screw or bolt to be threaded through the nut, Fig. 5 shows a nut positioning tool in which the notches are oppositely disposed in a vertical arrangement, Fig. 6 is an edge or side view of the Fig. 5, Fig. 7 shows a nut positioning tool in which the notches are oppositely disposed in a horizontal arrangement, and, Fig. 8 is an edge or side view of the Fig. 7.

Referring now in more detail to the preferred forms of the invention for using it as is illustrated herewith, the license plate 1 is placed against the rear bumper 2 with its apertures positioned over the apertures that are provided in the rear bumper for securing the plate thereto, then the tool 6 having a nut adhering thereto is inserted along the back side of the bumper and slid sideways until the feeling stud drops into the aperture in the bumper 2, after which the tool 6 is slightly shifted sideways so that the nut will register with the aperture in the bumper and the screw is then inserted through the plate 1 and the bumper 2 and screwed into the nut, after which the tool 6 is slid off the nut in either a downward motion or a sidewise motion as the case requires, and then used in the same manner to apply the opposite second anchoring screw for securing the license plate 1 to the bumper 2. In order for the nuts to cling to the tool 6 it is proposed to magnetize the tools so that the nuts will cling to the tools, and as when the nuts are to be utilized having non-magnetic characteristics, such as brass, it is proposed to smear the notched portions with a grease coating so that the brass nuts will cling to the tools during the interval of positioning the nuts so as to line up with the apertures for receiving the anchoring screws. It is obvious that magnetic means have been utilized before, and it is obvious that automotive mechanics have utilized a grease sticking means for holding parts that are to be positioned in inaccessible locations, but have not used the described clinging means in a device of the character that is shown and described herewith for positioning nuts in cramped spaces.

It is to be understood that the form of my invention, herewith shown and described, is to be taken as preferred examples of the same, and that various changes in the shape, size and arrangement of parts may be resorted to, without departing from the spirit and the concept of my invention, or the scope of the subjoined claim, and I reserve the right to the use of the various elements for practicing my invention.

Having thus described my invention, I claim:

A positioning device of the character described providing a united body comprising the combination of, a main body portion having a flat face side and a flat back side, said portion having one L-shaped notch extending through a corner of said portion, a thin flat faced body portion united to said main body portion and having one L-shaped notch extending through a corner thereof, the edges of the notch in the thin body portion extending past the edges of the notch in the main body portion, whereby a flat faced nut may be supported on the edges of the notch in the main body portion, and the back side of the thin body portion holds the nut on the edges of the notch in the main body portion.

References Cited in the file of this patent

UNITED STATES PATENTS

| 910,334 | Wesp | Jan. 19, 1909 |
| 2,586,756 | Wolfe et al. | Feb. 19, 1952 |

FOREIGN PATENTS

| 664,944 | Great Britain | Jan. 16, 1952 |